(12) United States Patent
Tseng et al.

(10) Patent No.: US 8,926,371 B2
(45) Date of Patent: Jan. 6, 2015

(54) DETACHABLE HANDLE AND ELECTRONIC DEVICE USING THE SAME

(71) Applicant: Quanta Computer Inc., Taoyuan Shien (TW)

(72) Inventors: Chen Tseng, Kaohsiung (TW); Yu-Chieh Liang, New Taipei (TW); Chi-Fu Chen, Taoyuan Shien (TW)

(73) Assignee: Quanta Computer Inc., Taoyuan Shien (TW)

( * ) Notice: Subject to any disclaimer, the term of this patent is extended or adjusted under 35 U.S.C. 154(b) by 50 days.

(21) Appl. No.: 13/781,034

(22) Filed: Feb. 28, 2013

(65) Prior Publication Data

US 2014/0030907 A1    Jan. 30, 2014

(30) Foreign Application Priority Data

Jul. 30, 2012   (TW) .............................. 101127481 A (51) Int. Cl.
*H01R 33/00*  (2006.01)
*H01R 13/62*  (2006.01)
*G06F 1/16*   (2006.01)

(52) U.S. Cl.
CPC .............. *H01R 13/62* (2013.01); *G06F 1/1632* (2013.01)
USPC ....................................................... 439/640

(58) Field of Classification Search
CPC ..................................................... H01R 33/975
USPC ........................ 439/11, 13, 31, 638, 640, 366
See application file for complete search history.

(56) References Cited

U.S. PATENT DOCUMENTS 5,681,176 A * 10/1997 Ibaraki et al. ................. 439/165
6,786,743 B2 *  9/2004 Huang .............................. 439/6

* cited by examiner

*Primary Examiner* — Phuongchi T Nguyen
(74) *Attorney, Agent, or Firm* — Rabin & Berdo, P.C.

(57) ABSTRACT

A detachable handle includes a body, a connector, a pivot joint, and a transmission element. The body includes a plurality of I/O ports. The pivot joint connects the body to the connector for switching a rotational angle between the body and the connector. The transmission element embedded in the body electrically connects the I/O ports to the connector. The pivot joint includes a first pivot plate and a second pivot plate pivoted to each other. A terminal of the first pivot plate is fixed to the body, and a terminal of the second pivot plate is fixed to the connector. An electronic device using the detachable handle is also disclosed.

9 Claims, 12 Drawing Sheets

DETACHABLE HANDLE AND ELECTRONIC DEVICE USING THE SAME

RELATED APPLICATIONS

This application claims priority to Taiwan Application Serial Number 101127481, filed Jul. 30, 2012, which is herein incorporated by reference.

BACKGROUND

1. Technical Field

The present disclosure relates to a detachable device. More particularly, the present invention relates to a detachable device with I/O ports.

2. Description of Related Art

With the advance of science and technologies, the electronic device is getting more and more compact in size, but without the convenience and performance sacrifice of the electronic device. Further, it is important for a portable electronic device to lose weight. Therefore, how to provide devices of high convenience and performance, but also of light weight is a constant striving in the industry.

SUMMARY

A detachable handle with fusion functionality and an electronic device using the detachable handle are disclosed. With the shape and the internal structure, the detachable handle fixed to the main body of the electronic device can satisfy varies requirements of users, such that the disadvantages of conventional detachable devices can be improved.

An aspect of the invention provides a detachable handle. The detachable handle includes a body, a connector, a pivot joint, and a transmission element. The body includes a plurality of I/O ports. The pivot joint connects the body to the connector, which the pivot joint is configured for switching a rotational angle between the body and the connector. The pivot joint includes a first pivot plate and a second pivot plate pivoted to each other. A terminal of the first pivot plate is fixed to the body, and a terminal of the second pivot plate is fixed to the connector. The transmission element embedded in the body electrically connects the I/O ports to the connector.

Another aspect of the invention provides an electronic device. The electronic device includes a detachable handle and a main body. The detachable handle includes a body, a connector, a pivot joint, and a transmission element. The body includes a plurality of I/O ports. The pivot joint connects the body to the connector, which the pivot joint is configured for switching a rotational angle between the body and the connector. The transmission element embedded in the body electrically connects the I/O ports to the connector. The main body includes a connection slot. The connector of the detachable handle is detachably engaged to the connection slot.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
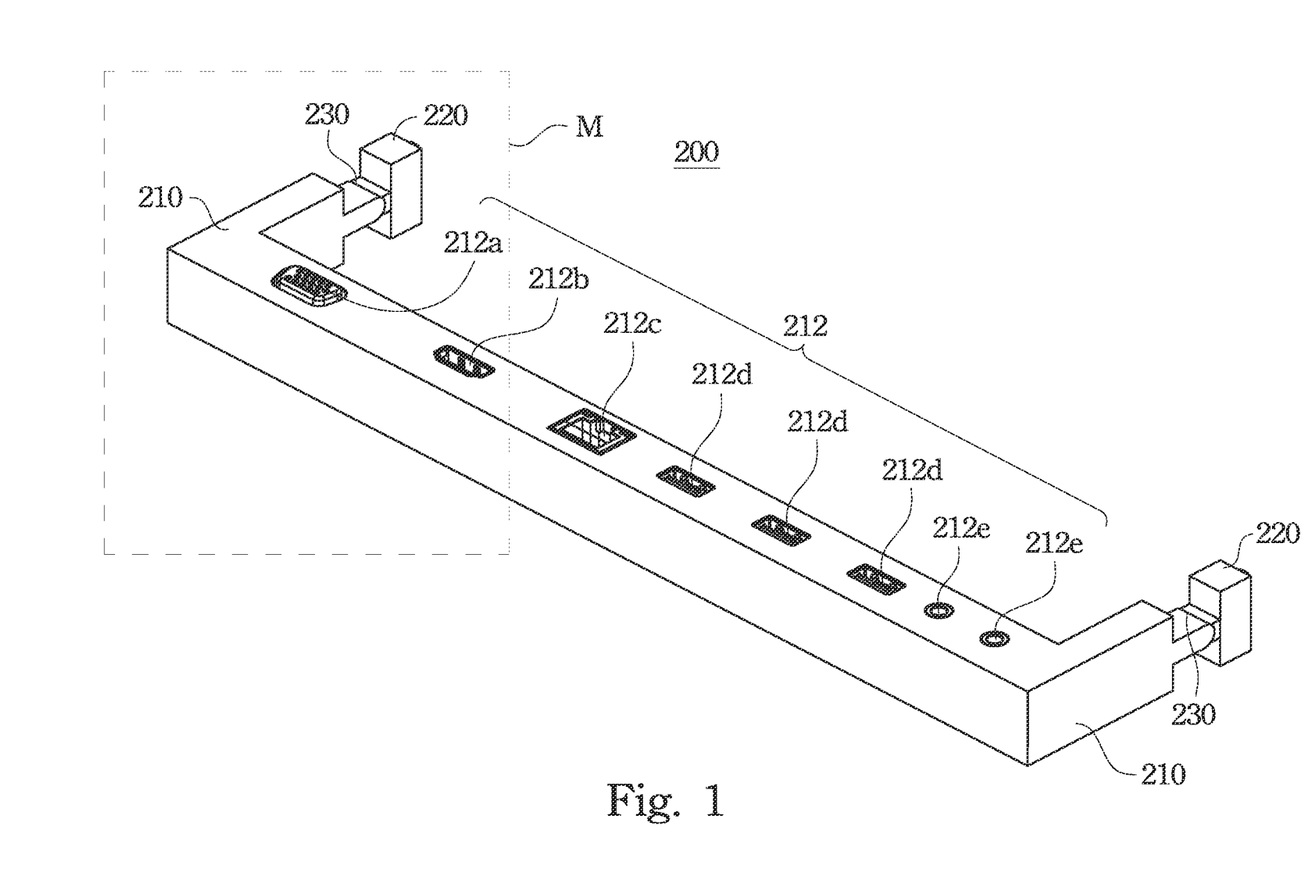
FIG. 1 is a schematic diagram of a detachable handle according to one embodiment of the present invention.
Figure 2:
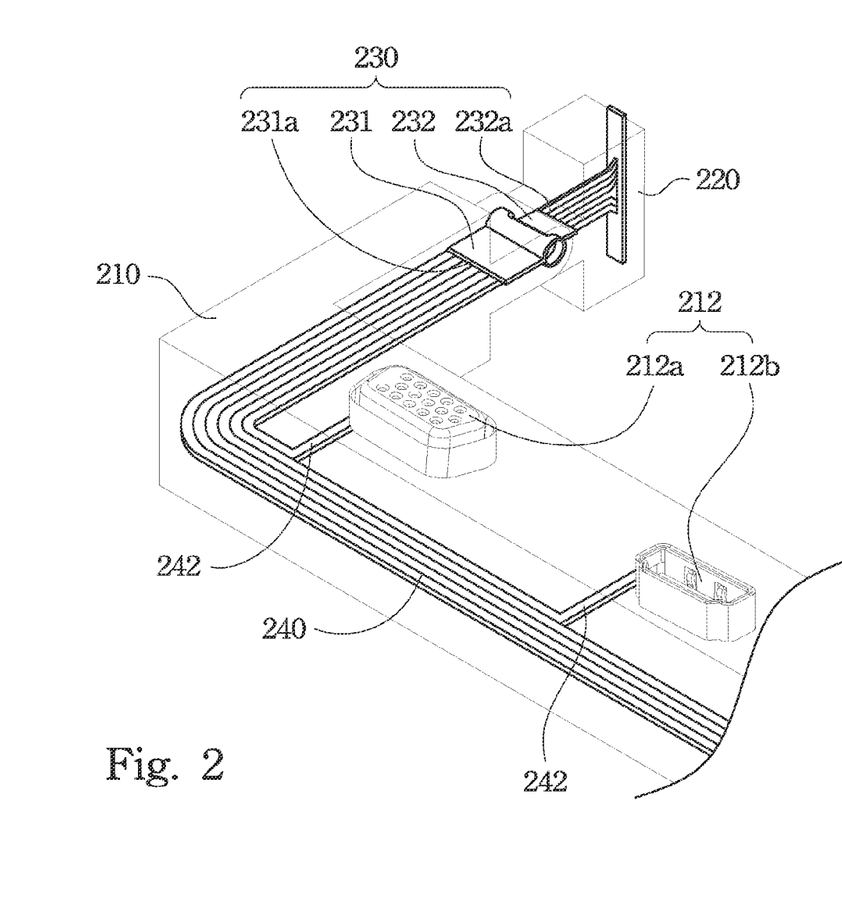
FIG. 2 is a perspective diagram in area M of FIG. 1.

FIG. 1 is a schematic diagram of a detachable handle 200 according to one embodiment of the present invention. FIG. 2 is a perspective diagram in area M of FIG. 1. A detachable handle 200 includes a body 210, a connector 220, a pivot joint 230, and a transmission element 240. The body 210 may be in a shape of a handle, and the body 210 connects to the connector 220 through the pivot joint 230. The body 210 includes a plurality of I/O ports 212. These I/O ports 212 are electrically coupled to the connector 220 through the transmission element 240 individually. Therefore, A detachable I/O ports functionality can be achieved by transmitting the signals of the I/O ports 212 to the connector 220 through the transmission element 240. The connector 220 transmits the signals of the I/O ports 212 to a main body of an electronic device matched to the detachable handle 200. In a preferred embodiment, the connector 220 may be a general connector, such as a universal series bus (USB) connector, a cable connector, or a wiring connector.

In one or more embodiments, the shape of the detachable handle 200 can be different according to different requirements. In other words, the shape of the detachable handle 200 may be U-shaped, as shown in FIG. 1, or L-shaped, T-shaped, or any combination thereof in other embodiments. That is, the shape of the detachable handle 200 is not limited as long as the detachable handle 200 can achieve the foregoing functions. Similarly, the numbers of the pivot joint 230 and the connector 220 may be different according to the shape of the detachable handle 200. The person having ordinary skill in the art may design the numbers of the pivot joint 230 and the connector 220 according to actual requirements.

The I/O ports 212 are distributed on the shell of the body 210, but the distribution positions on the shell of the body 210 are not specific. In one embodiment, the I/O ports 212 can be disposed on the same side of the shell of the body 210. Therefore, not only wires inserted to the I/O ports 212 can be arranged easily, but also it is more flexible to place the detachable handle 200. For example, for the detachable handle 200 disposed on a plate, any side, except for the side with I/O ports 212, can be a surface attached to a supporting surface, a tabletop for example, according to actual requirements.

The I/O ports 212 includes a Video Graphics Array (VGA) port (for example, a D-sub connector 212*a*), a High Definition Multimedia Interface (HDMI) port 212*b*, a RJ45 connector 212*c*, an Universal Series Bus (USB) port 212*d*, and audio ports 212*e* (for example, an Audio-In port or an Audio-Out port). It should be understood that the foregoing types of the I/O ports 212 are illustrative only and should not limit the scope of the claimed invention. The person having ordinary skill in the art may design the I/O ports 212 according to actual requirements. For example, the I/O ports 212 may include a RS-232 port or a card reader port.

Figure 5:
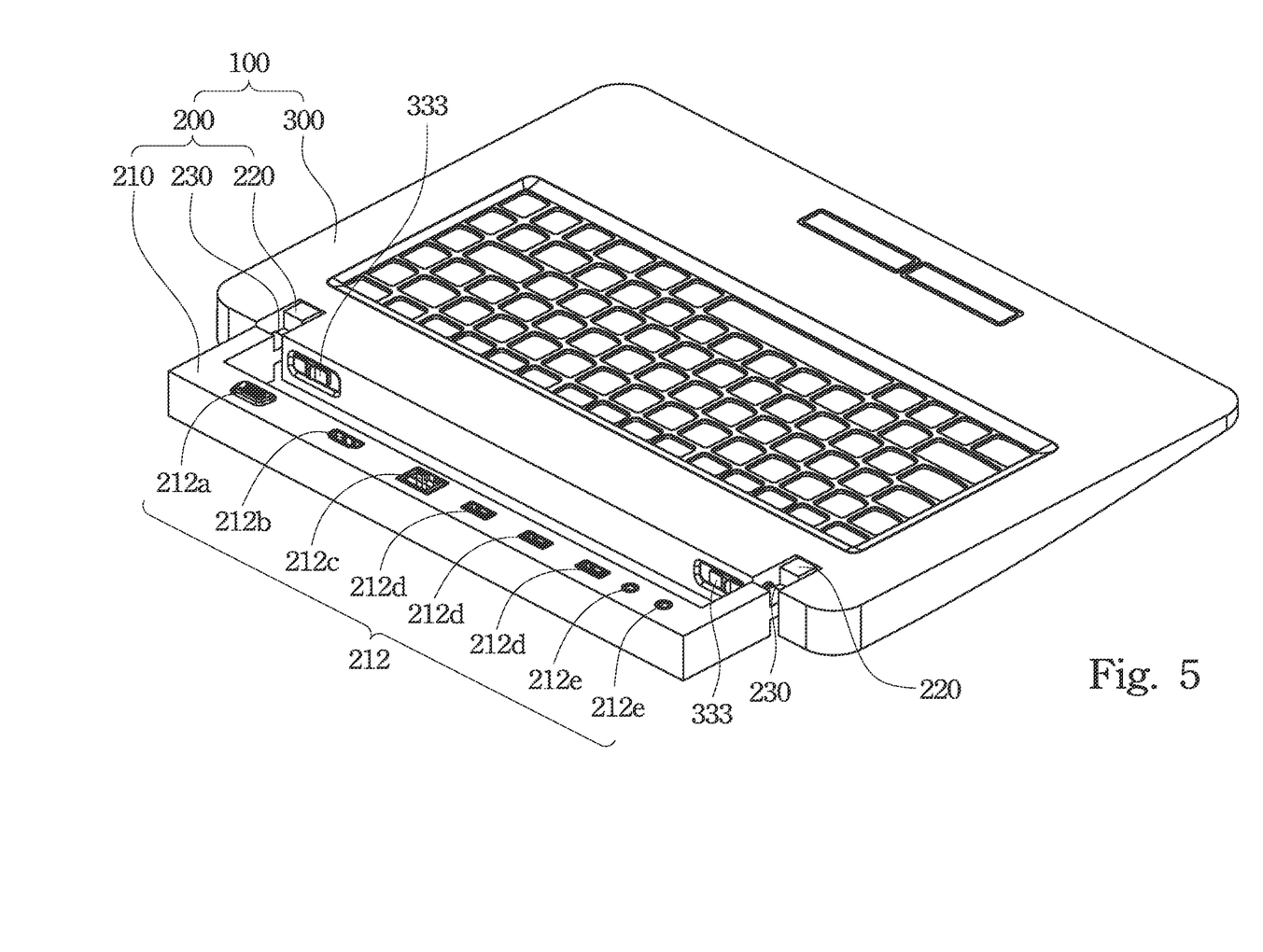
FIG. 5 is a schematic diagram of an electronic device with the detachable handle and a main body engaged to each other according to one embodiment of the present invention.
Figure 6:
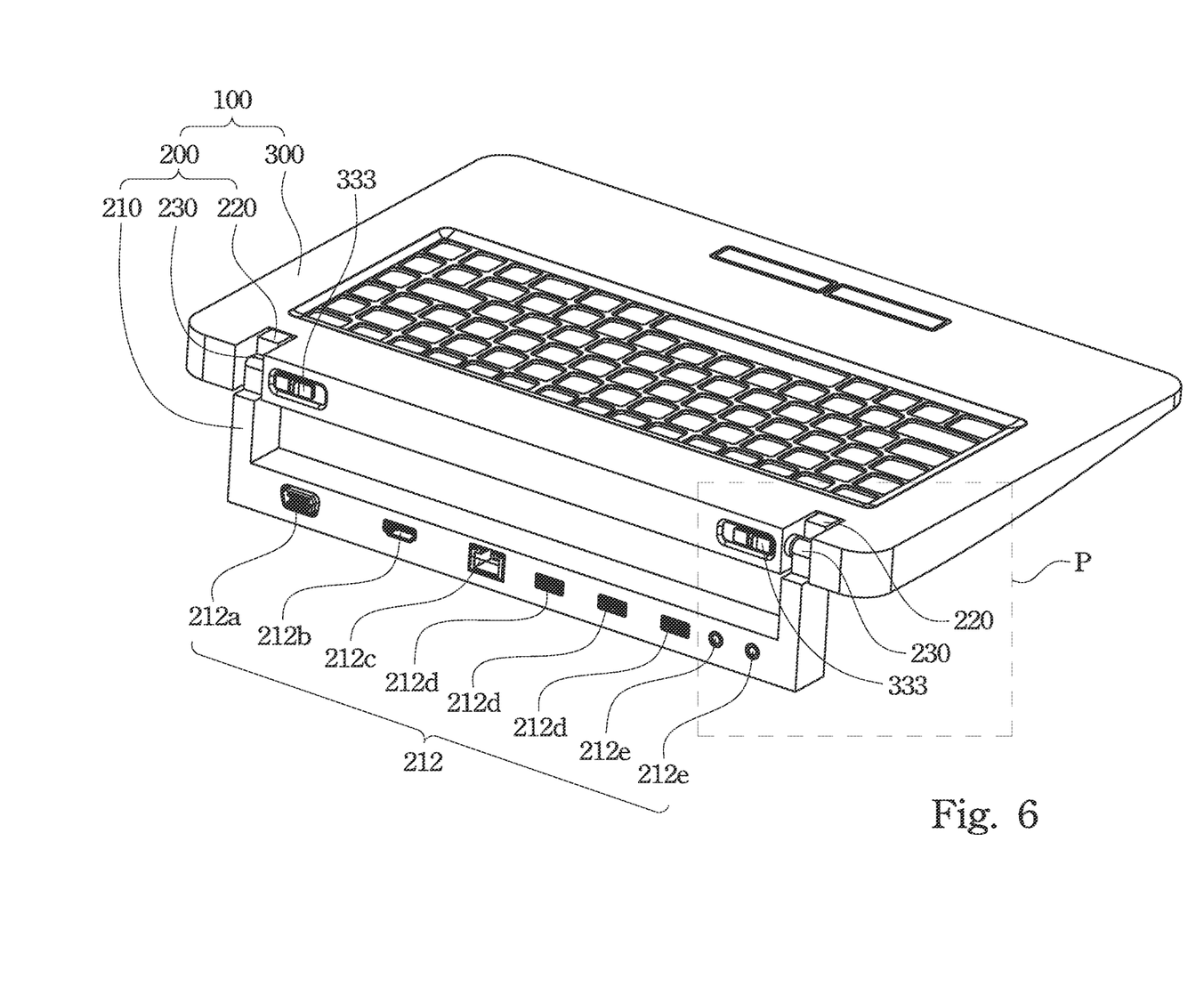
FIG. 6 is a schematic diagram of the electronic device when the rotational angle of the pivot joint is 90 degrees.

The pivot joint 230 includes a first pivot plate 231 and a second pivot plate 232 pivoted to each other. A terminal 231*a* of the first pivot plate 231 is fixed to the body 210, and a terminal 232*a* of the second pivot plate 232 is fixed to the connector 220. The first pivot plate 231 and the second pivot plate 232 can rotate with the main body 210 and the connector 220 respectively along a rotational axis, i.e., the pivot joint 230, such that the detachable handle 200 can be a handle, as shown in FIG. 5, or a supporting stand, as shown in FIG. 6.

The transmission element 240 is embedded in the body 210 to avoid the damages that may be caused by the users. The transmission element 240 includes a plurality of wires 242 whose one terminal is electrically connected to any one of the I/O ports 212, and the other terminal is electrically connected to the connector 220, such that the signal of every I/O port 212 can be electrically coupled to the connector 220. In one or more embodiments, the transmission element 240 may be made of flexible material, such as a flexible flat cable (FFC) or a flexible printed circuit (FPC), to avoid the damage that cause the transmission element 240 being broken while the transmission element 240 is being curved, i.e. the rotational angle is changed.

Figure 3A:
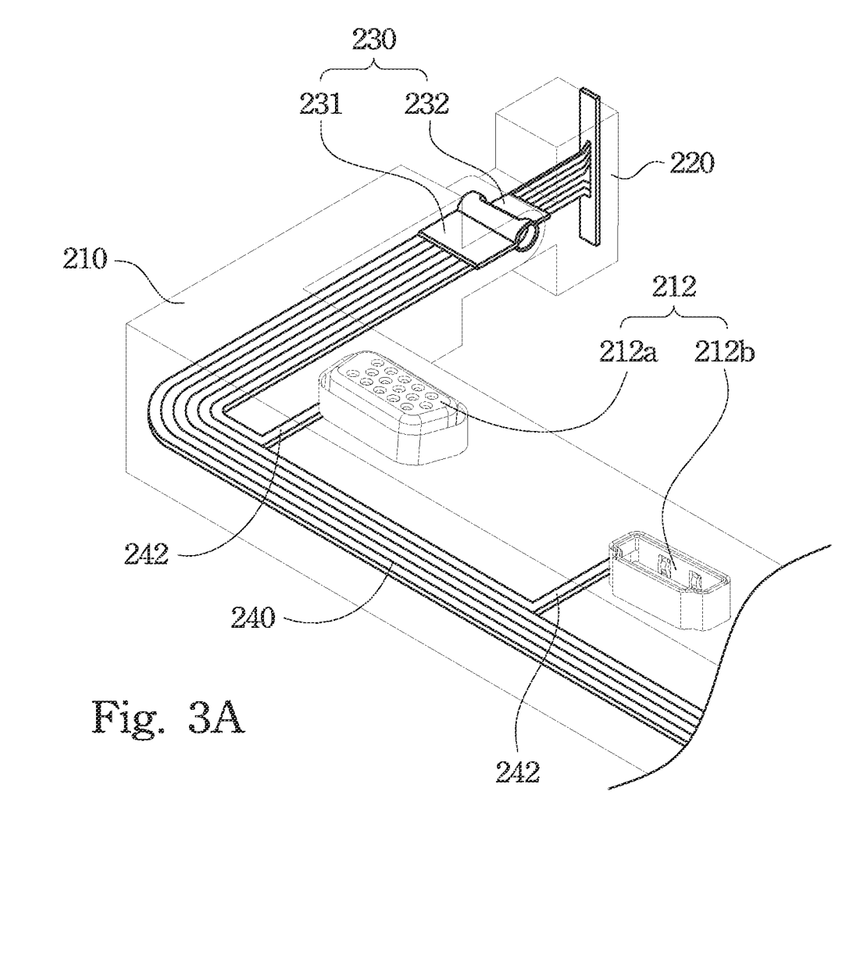
FIG. 3A to FIG. 3D are perspective diagrams of the body and the connector in FIG. 2 with different rotational angles.
Figure 3B:
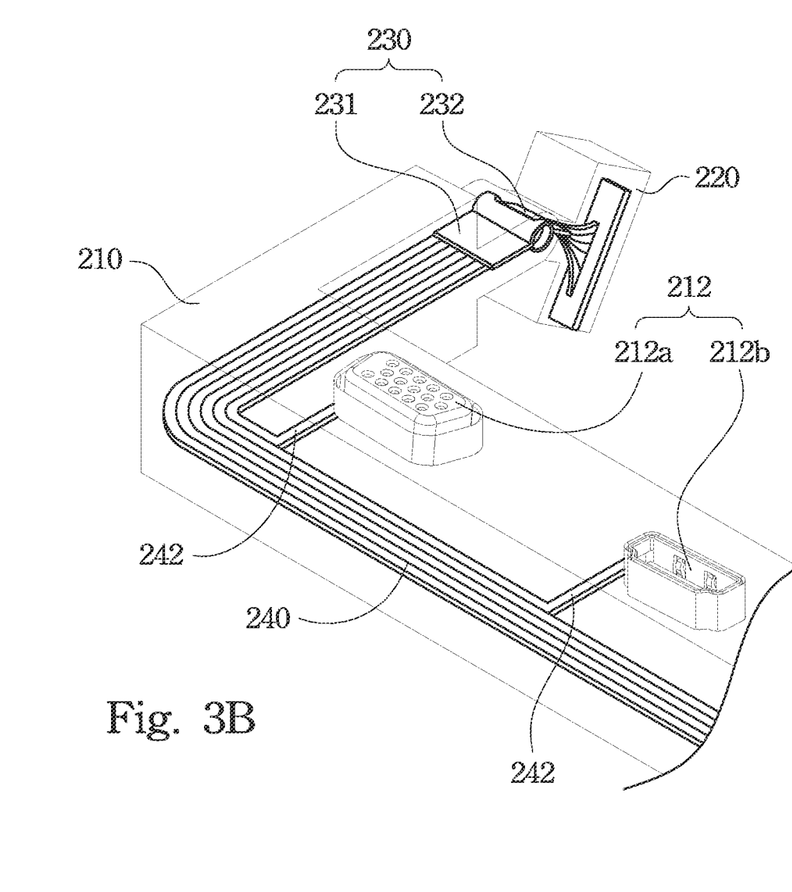
Figure 3C:
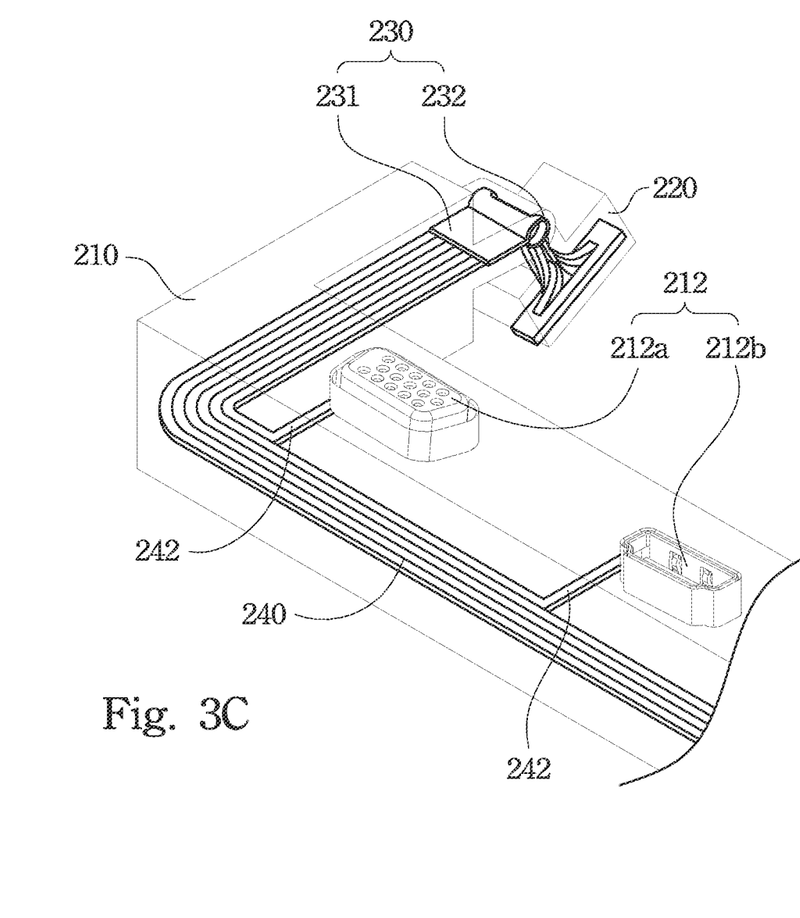
Figure 3D:
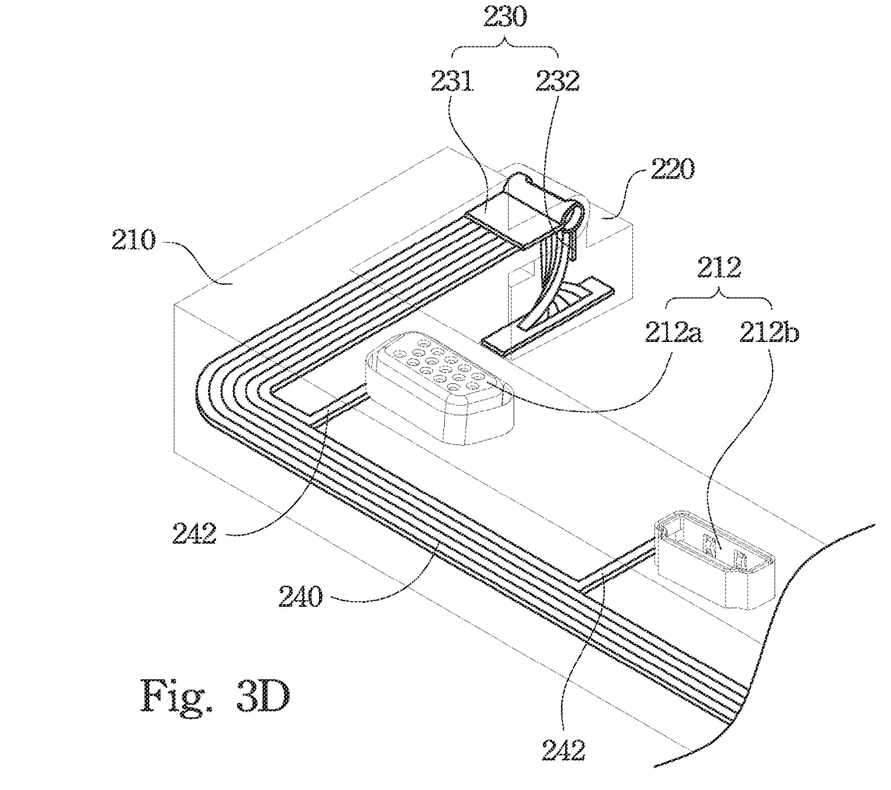

FIG. 3A to FIG. 3D are perspective diagrams of the body 210 and the connector 220 with different rotational angles in FIG. 2. It should be noticed that both internal and external elements in FIG. 3A to FIG. 3D are illustrated with solid lines for exhibiting the internal elements in the detachable handle 200 clearly. The rotational angle between the body 210 and the connector 220 may be 0 degree, as shown in FIG. 3A. The rotational angle between the body 210 and the connector 220 may be 30 degree, as shown in FIG. 3B. The rotational angle between the body 210 and the connector 220 may be 60 degree, as shown in FIG. 3C. The rotational angle between the body 210 and the connector 220 may be 90 degree, as shown in FIG. 3D. It should be understood that the foregoing rotational angles between the body 210 and the connector 220 are illustrative only and should not limit the scope of the claimed invention. The rotational angles of present invention are not limited from the foregoing angles. On the other hand, in one or more embodiments of present invention, when the numbers of the connector 220 and the pivot joint 230 are both larger than one, each rotational angle between the connector 220 and the body 210 may be different, which means each of the pivot joints 230 can rotate independently, and the rotational motion of any pivot joint 230 won't effect that of other pivot joints 230.

Another aspect of present invention provides an electronic device 100 using the foregoing detachable handle 200. It should be understood that the details of foregoing detachable handle 200 will not be described in detail in the following, and only the variations in the following embodiments will be described.

Figure 4:
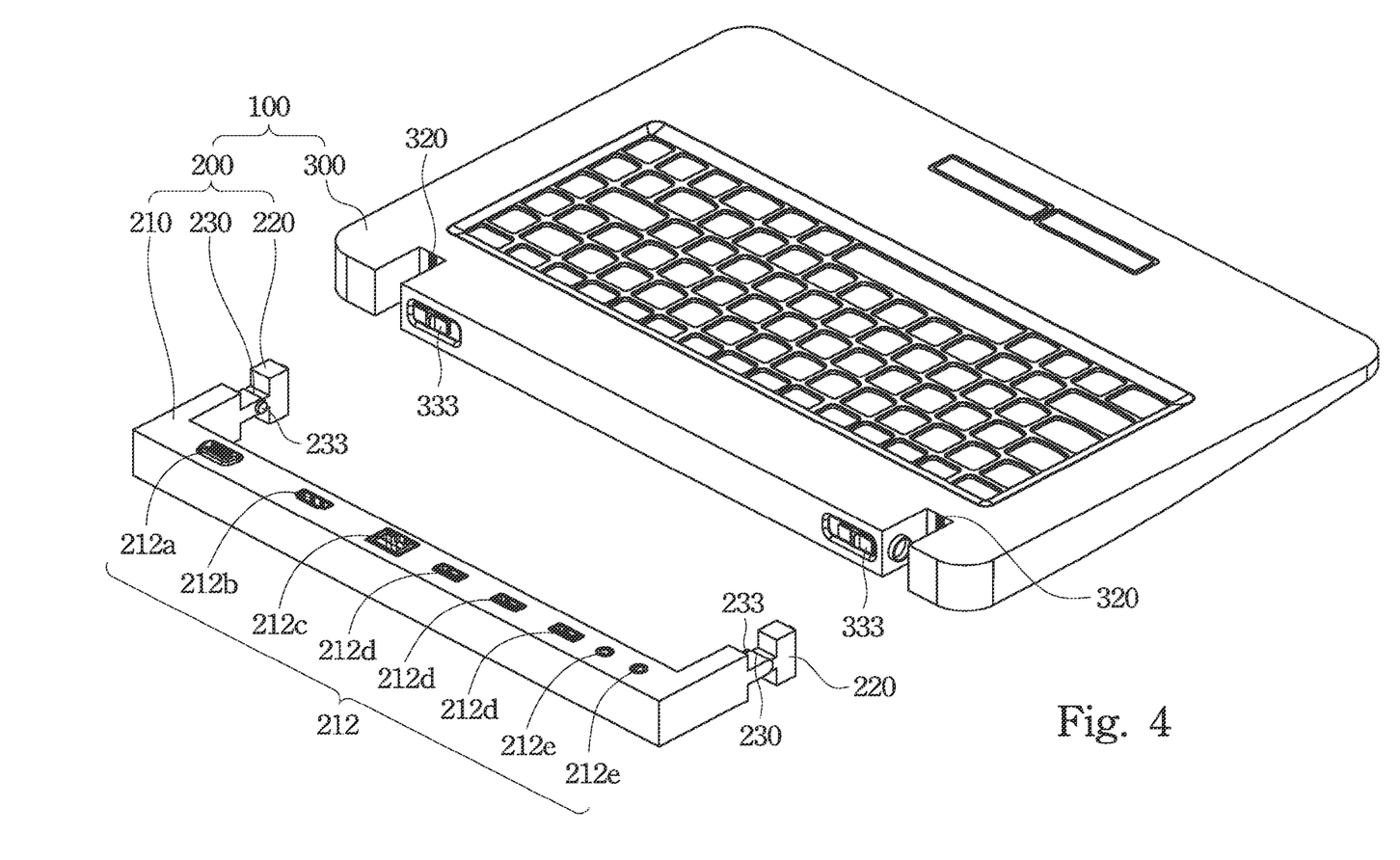
FIG. 4 is a schematic diagram of an electronic device with the detachable handle and a main body detached from each other according to one embodiment of the present invention.

FIG. 4 is a schematic diagram of an electronic device 100 with the detachable handle 200 and a main body 300 detached from each other according to one embodiment of the present invention. FIG. 5 is a schematic diagram of an electronic device 100 with the detachable handle 200 and a main body 300 engaged to each other according to one embodiment of the present invention. An electronic device 100 includes the foregoing detachable handle 200 and a main body 300. The main body 300 may be a notebook, a tablet personal computer, or a smart phone. The main body 300 includes at least one connection slot 320 disposed on one side of the main body 300. The type of the connection slot 320 is matched to the connector 220 of the detachable handle 200, such that the detachable handle 200 can be engaged to the main body 300 through the coupling of the connector 220 and the connection slot 320. Therefore, the user can lift the whole electronic device 100 easily by holding the detachable handle 200. On the other hand, since the signals of the I/O ports 212 on the detachable handle 200 can be transmitted to the connector 220, and then is transmitted to the main body 300 through the coupling of the connector 220 and the connection slot 320, the main body 300 can then process the signals of the I/O ports 212. In other words, the detachable handle 200 can be physically and electrically coupled to the main body 300 through the coupling of the connector 220 and the connection slot 320.

FIG. 6 is a schematic diagram of the electronic device 100 when the rotational angle of the pivot joint 230 is 90 degrees. In present embodiment, one side of the main body 300 can be lifted by adjusting the rotational angle of the pivot joint 230 of the detachable handle 200. For example, the rotational angle in present embodiment is 90 degrees. Therefore, not only a space formed from the main body 300 with one lifted side can dissipate the heat generated from the electronic device 100, but also the detachable handle 200 can be a supporting stand of the electronic device 100. More specifically, the lifted height of one side of the main body 300 can be adjusted depending on the ergonomics of the users during operating the electronic device 100. It should be understood that the foregoing rotational angle is illustrative only and should not limit the scope of the claimed invention. The rotational angle can be any angle as long as the I/O ports 212 of the detachable handle 200 are exposed on the outside of the electronic device 100.

Figure 7:
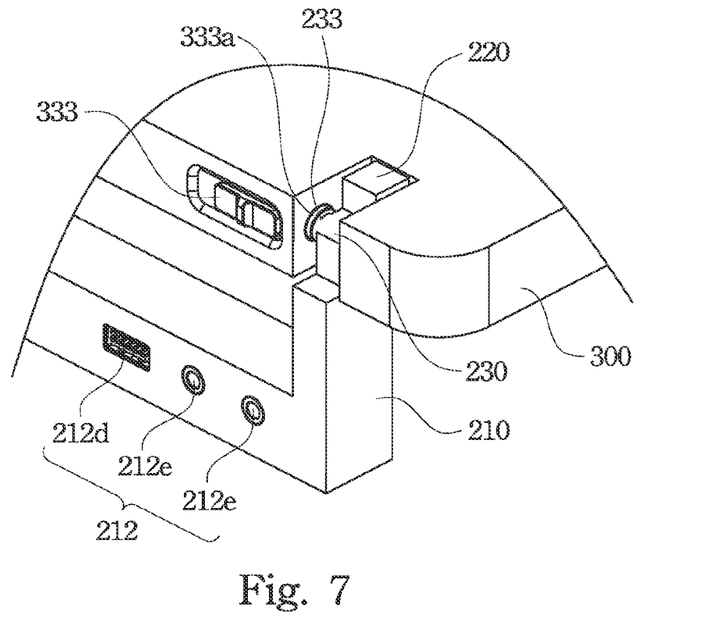
FIG. 7 is a magnified illustration diagram in area P of FIG. 6.
Figure 8:
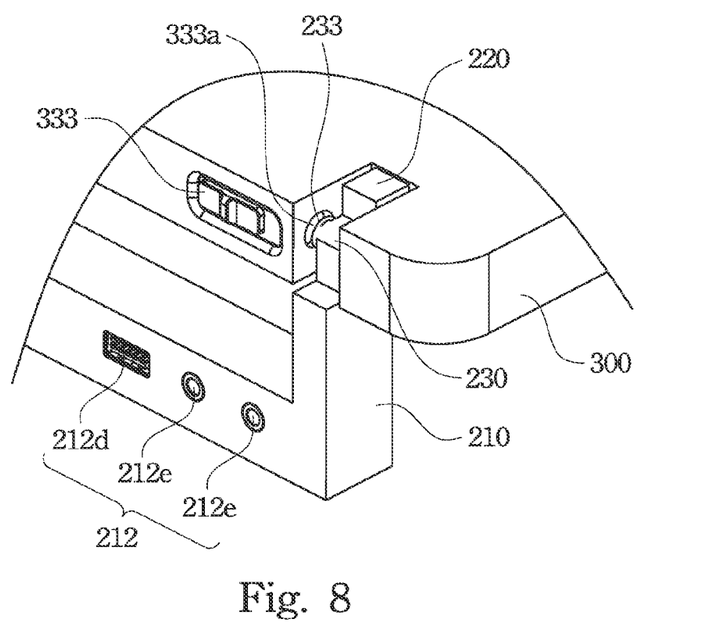
FIG. 8 is a schematic diagram of the electronic device in FIG. 7 when a bump portion and a fixing portion are detached from each other.

FIG. 7 is a magnified illustration diagram in area P of FIG. 6. FIG. 8 is a schematic diagram of the electronic device 100 in FIG. 7 when a bump portion 233 and a fixing portion 333 are detached from each other. In one or more embodiments, a bump portion 233 can be extended from the detachable handle 200, and a fixing portion 333 can be added to a relative position on the main body 300 for further fixing the detachable handle 200 to the main body 300. When the connector 220 is coupled to the connection slot 320, the fixing portion 333 can be engaged to the bump portion 233 to fix the detachable handle 200 to the main body 300. In present embodiment, the fixing portion 333 may be a sleeve 333*a*. The user can move the sleeve 333*a* horizontally to hold the bump portion 233 when the detachable handle 200 is engaged to the main body 300. Therefore, the detachable handle 200 can be fixed firmly to the main body 300 through the couplings between the connector 200 and the connection slot 320, and between the sleeve 333*a* and the bump portion 233.

The bump portion 233 and the sleeve 333*a* can be engaged if the overlapping depth of the bump portion 233 and the sleeve 333*a* is about 0.5 mm to 1 mm. On the other hand, a loose fit coupling can be used to engage the bump portion 233 and the sleeve 333*a*, such that the bump portion 233 and the sleeve 333*a* won't be damaged due to the frictions occurred between the bump portion 233 and the sleeve 333*a*. In other words, the bump portion 233 and the sleeve 333*a* do not touch each other, i.e. a gap exists between the outer wall of the bump portion 233 and the inner wall of sleeve 333*a*, when the bump portion 233 and the sleeve 333a are engaged. The gap is substantially in a range between 0.1 mm to 0.2 mm.

On the other hand, if the bump portion 233 is disposed on the body 210, the coupling of the sleeve 333a and the bump portion 233 may cause the rotational inconvenience of the electronic device 100 since the relative position between the body 210 of the detachable handle 200 and the main body 300 depends on the rotational angle of the detachable handle 200. Therefore, the bump portion 233 may be disposed on one side of the pivot joint 230, and the fixing portion 333 can be added to the position relative to the bump portion 233 on the main body 300 to engage the pivot joint 230.

Figure 9:
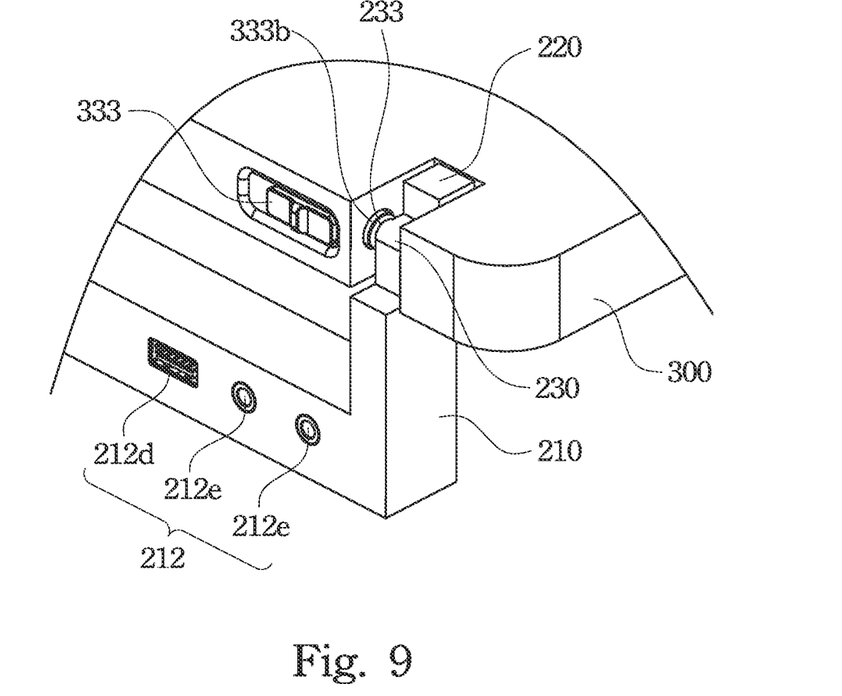
FIG. 9 is a schematic diagram of the electronic device according to another embodiment of the present invention.

In one or more embodiments, the fixing portion 333 may be a block 333b, as shown in FIG. 9. The user can move the block 333b horizontally to abut against the bump portion 233 when the detachable handle 200 is engaged to the main body 300. The frictional forces between contact surfaces of the block 333b and the bump portion 233 can help to avoid the detachable handle 200 detached from the main body 300.

Figure 10A:
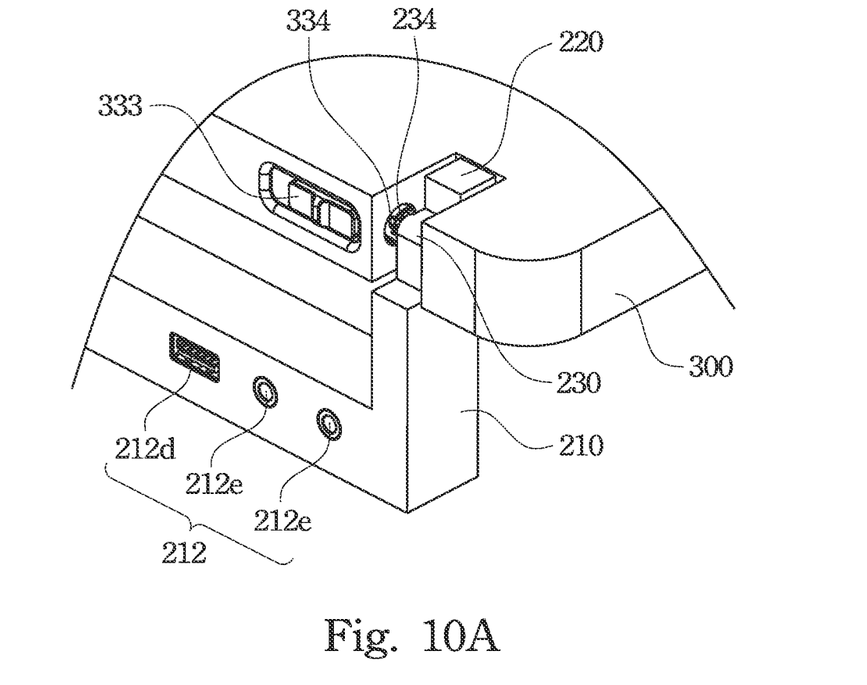
FIG. 10A is a schematic diagram of an electronic device according to yet another embodiment of the present invention.
Figure 10B:
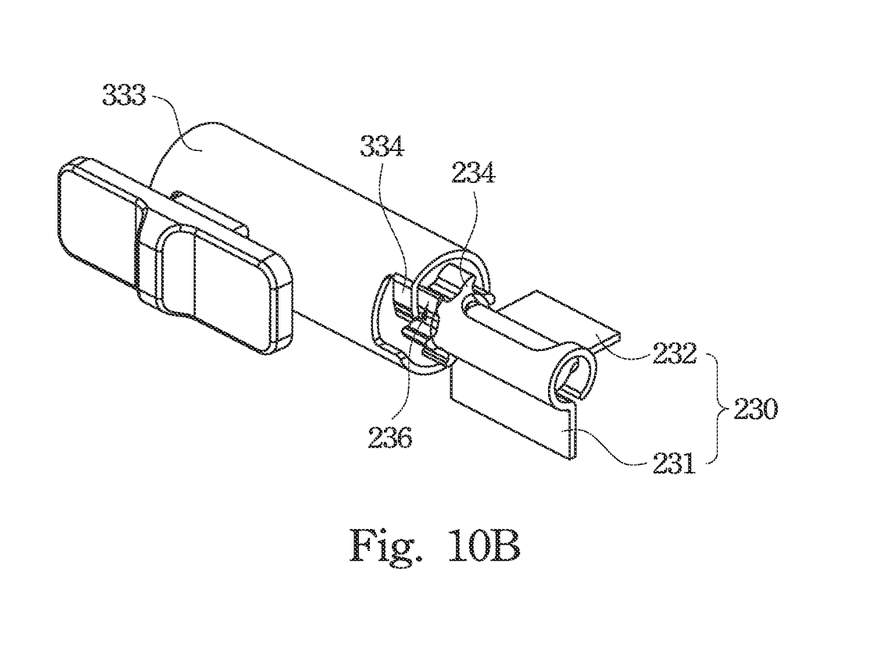
FIG. 10B is a schematic diagram of the fixing portion, a latch, a ratchet, and the pivot joint in FIG. 10A.

FIG. 10A is a schematic diagram of an electronic device 100 according to yet another embodiment of the present invention. FIG. 10B is a schematic diagram of the fixing portion 333, a latch 334, a ratchet 234, and the pivot joint 230 in FIG. 10A. The bump portion 233 may be a ratchet 234 fixed on the pivot joint 230, i.e. the ratchet 234 is unable to rotate relative to the pivot joint 230, for the convenience of fixing the rotational angle of the pivot joint 230. The ratchet 234 has a plurality of concave surfaces 236, and the fixing portion 333 includes a latch 334 disposed in front of the fixing portion 333. The latch 334 is engaged to one of the concave surface 236 of the ratchet 234 when the fixing portion 333 is coupled to the ratchet 234, such that the ratchet 234 is unable to rotate, i.e. the rotational angle of the pivot joint 230 is fixed. In contrast, the rotational angle of the pivot joint 230 can be changed when the latch 334 and the ratchet 234 is uncoupled.

In summary, a detachable handle 200 with fusion functionality and an electronic device 100 using the detachable handle 200 are provided. With the shape and the internal structure, the detachable handle 200 coupled to the main body 300 of the electronic device 100 can satisfy varies requirements. The detachable handle 200 includes a plurality of I/O ports 212 electrically coupled to the main body 300 through the coupling of the connector 220 and the connection slot 320 of the main body 300. In this way, the size of the main body 300 can be efficiently reduced. On the other hand, since the detachable handle 200 is in a handle shape, a user can lift the electronic device 100 by holding the handle when he or she carries the electronic device 100. Thus, it is more convenience to carry the electronic device 100. Moreover, since the connector 220 of the detachable handle 200 is a general connector, the detachable handle 200 may match different main body 300 as long as the main body 300 has a connection slot 320 matched to the connector 220.

On the other hand, heats usually generated from the electronic device 100 during operation. If they are unable to be dissipated from the electronic device 100 in time, the electronic device 100 may be damaged. Therefore, one side of the main body 300 may be lifted by rotating the pivot joint 230 of the detachable handle 200. Air in a space generated below the main body 300 therefore can be used to dissipate the heats. Also, since the detachable handle 200 with lifting function owns ergonomics, the user can adjust the height of the electronic device 100 according to actual requirements.

On the other hand, when the detachable handle 200 is engaged to the main body 300, the coupling of the bump portion 233 extended from the pivot joint 230 and the fixing portion 333 added at the relative position of the main body 300 will enhance the supporting ability of the detachable handle 200 to the main body 300. Furthermore, if the bump portion 233 is a ratchet 234, and the fixing portion 333 includes a latch 334, the latch 334 can be coupled to any concave surface 236 of the ratchet 234 to fix the rotational angle of the ratchet 234 after the fixing portion 333 is engaged to the bump portion 233. Therefore, the rotational angle of the pivot joint 230 is fixed, such that the pivot joint 230 is not easy to rotate under any unexpected conditions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A detachable handle detachably engaged to a main body having a fixing portion, comprising:
a body comprising a plurality of I/O ports;
a connector;
a pivot joint connecting the body to the connector, configured for switching a rotational angle between the body and the connector, wherein the pivot joint comprises a first pivot plate and a second pivot plate pivoted to each other, a terminal of the first pivot plate is fixed to the body, and a terminal of the second pivot plate is fixed to the connector, the pivot joint further comprising a bump portion, the fixing portion being engaged to the bump portion to fix the detachable handle to the main body when the detachable handle is inserted to the main body; and
a transmission element embedded in the body for electrically connecting the I/O ports to the connector.

2. An electronic device comprising:
a detachable handle, comprising:
a body comprising a plurality of I/O ports;
a connector;
a pivot joint connecting the body to the connector, configured for switching a rotational angle between the body and the connector, and comprising a bump portion; and
a transmission element embedded in the body for electrically connecting the I/O ports to the connector; and
a main body comprising a connection slot and a fixing portion, wherein the connector of the detachable handle is detachably engaged to the connection slot, the fixing portion being engaged to the bump portion to fix the detachable handle to the main body when the connector is inserted to the connection slot.

3. The electronic device of claim 2, wherein the bump portion is a ratchet having a plurality of concave surfaces, and the fixing portion comprises a latch engaged to one of the concave surfaces to fix the rotational angle of the pivot joint.

4. The electronic device of claim 2, wherein the fixing portion is a sleeve for horizontally moving to hold the bump portion when the detachable handle is engaged to the main body.

5. The electronic device of claim 2, wherein the fixing portion is a block, the block is moved horizontally to abut against the bump portion when the detachable handle is engaged to the main body.

6. The electronic device of claim 2, wherein the pivot joint comprises a first pivot plate and a second pivot plate pivoted to each other, a terminal of the first pivot plate is fixed to the body, and a terminal of the second pivot plate is fixed to the connector.

7. The electronic device of claim 2, wherein the transmission element is a flexible flat cable or a flexible printed circuit.

8. The electronic device of claim 2, wherein the connector is a universal series bus connector, a cable connector, or a wiring connector.

9. The electronic device of claim 2, wherein the detachable handle is in U-shaped, L-shaped, or T-shaped.

* * * * *